INVENTOR,
Earl H. Francis.
BY Roy E. Hamilton,
ATTORNEY.

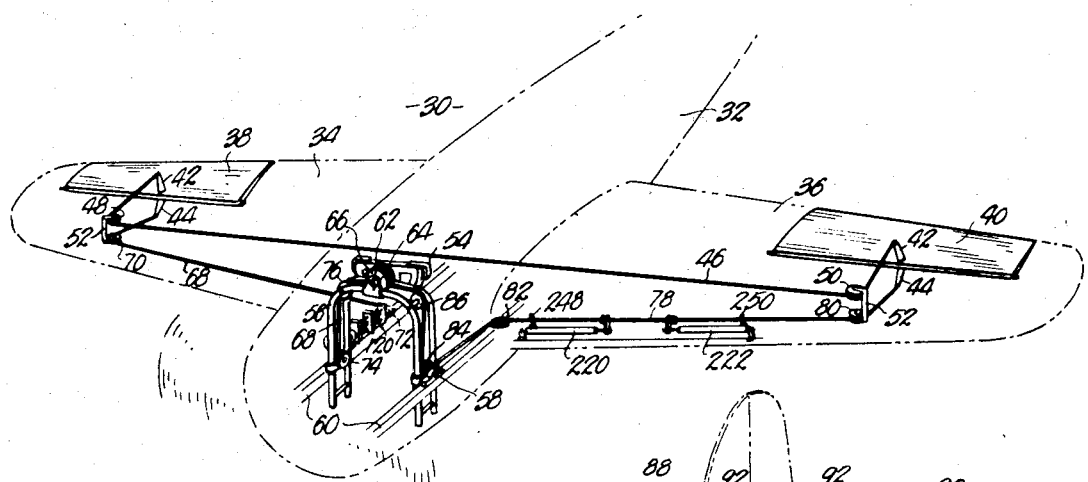

May 30, 1944.  E. H. FRANCIS  2,350,024
AUTOMATIC PILOT FOR AIRPLANES
Filed Dec. 9, 1940  6 Sheets-Sheet 3

INVENTOR,
Earl H. Francis.
BY Roy E. Hamilton,
ATTORNEY.

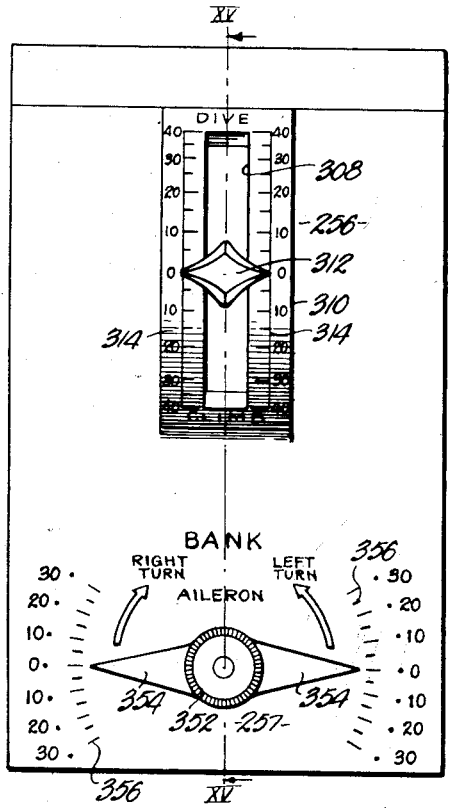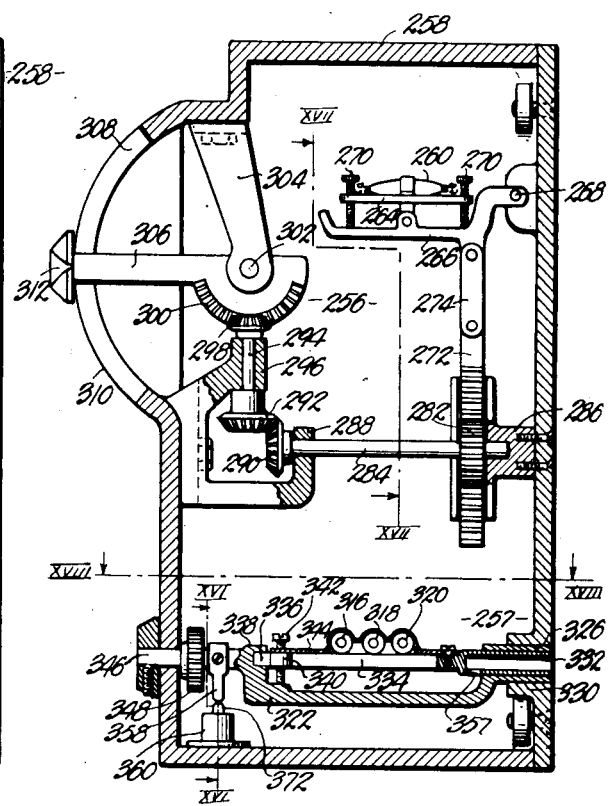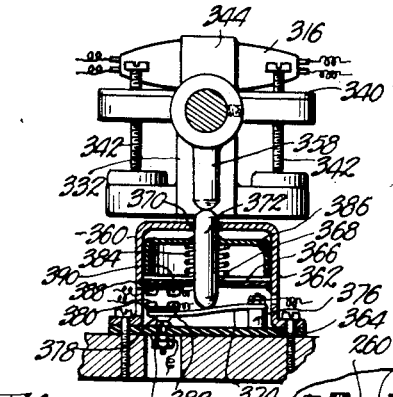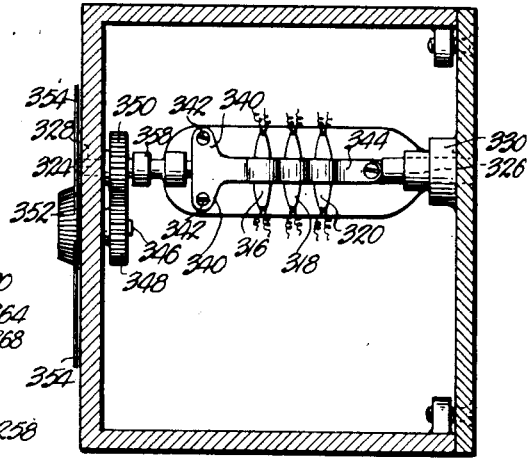

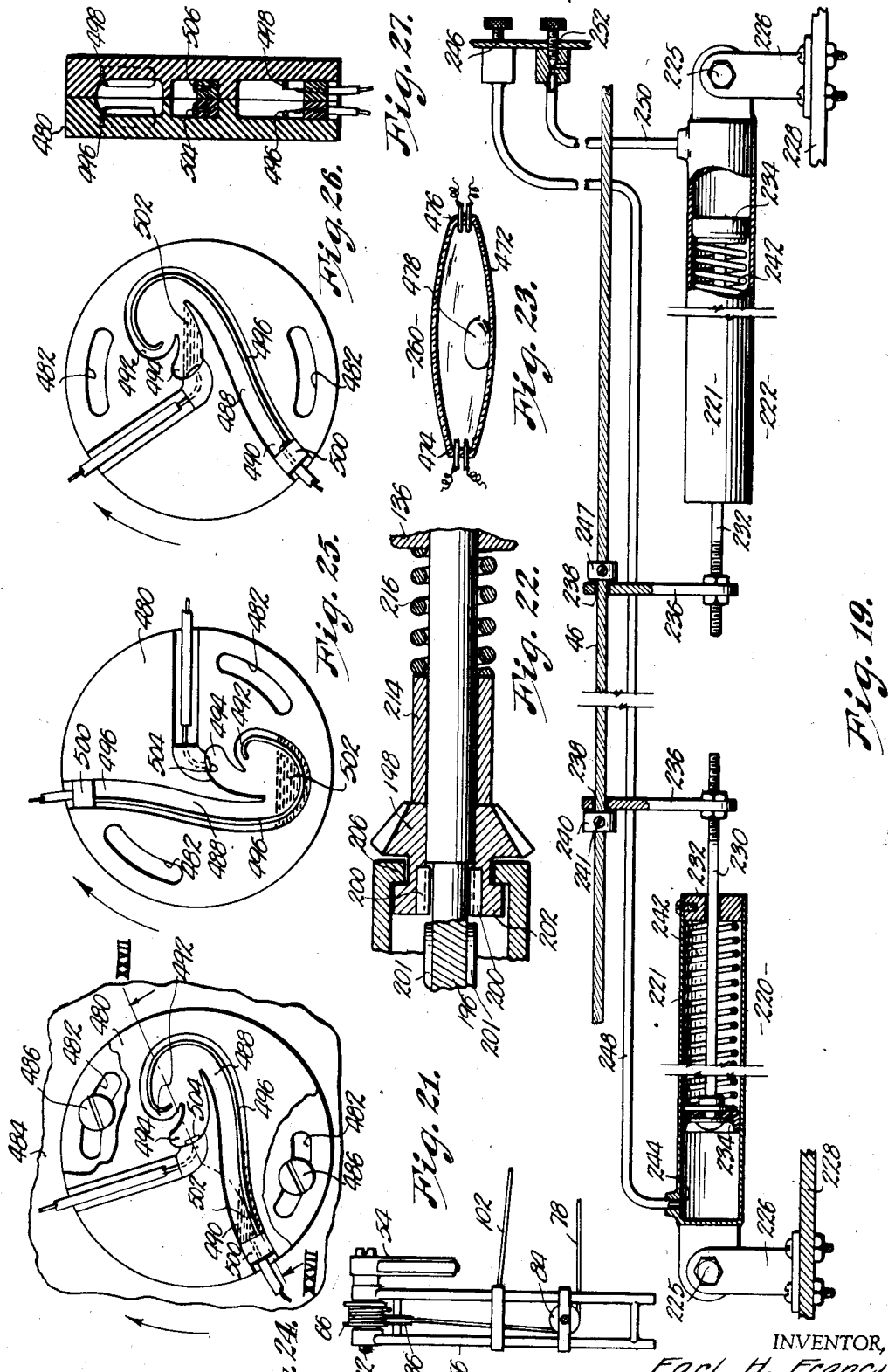

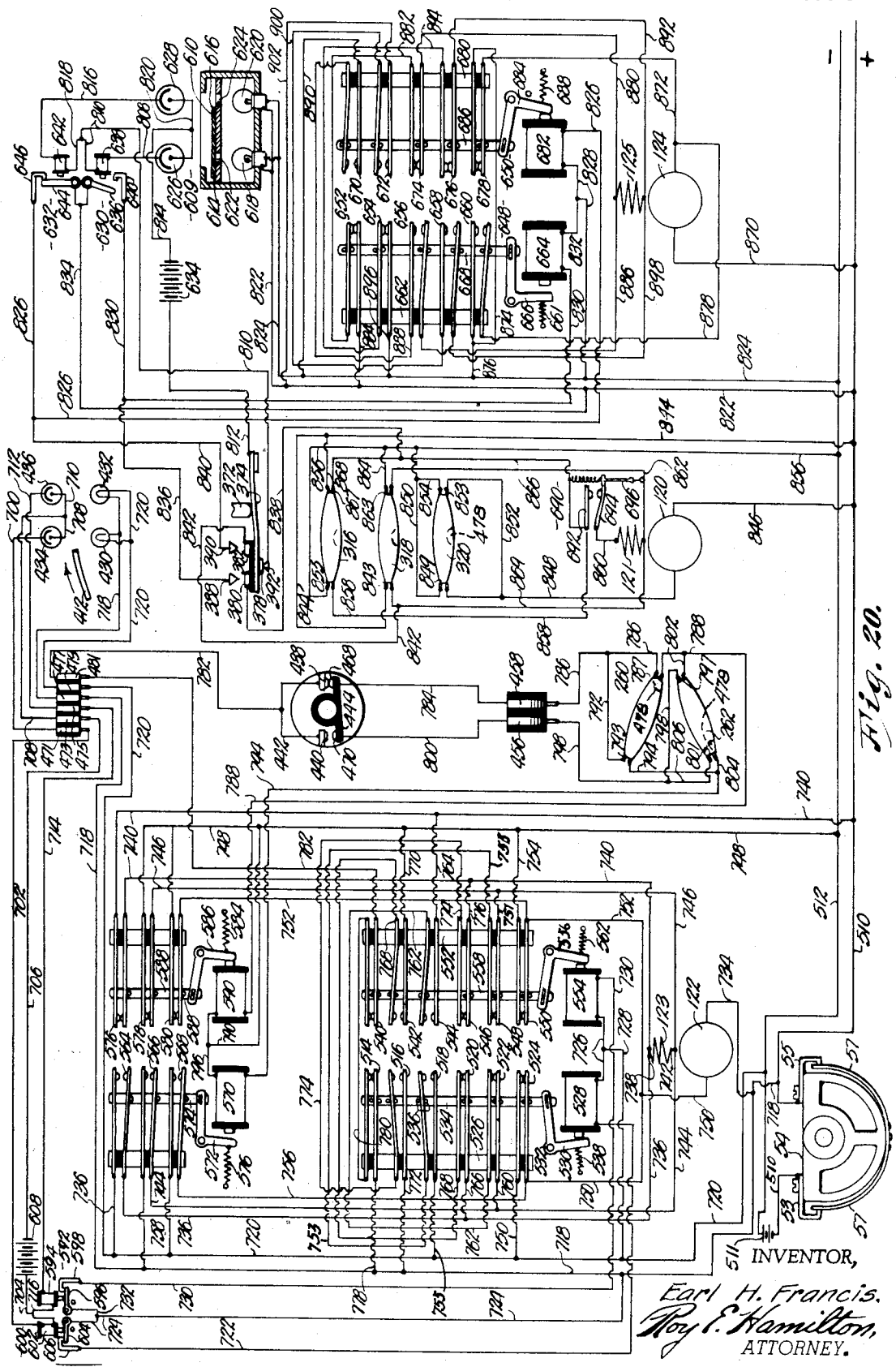

Patented May 30, 1944

2,350,024

UNITED STATES PATENT OFFICE 2,350,024

AUTOMATIC PILOT FOR AIRPLANES

Earl Henry Francis, Kansas City, Mo.

Application December 9, 1940, Serial No. 369,242

2 Claims. (Cl. 244—76)

This invention relates to improvements in automatic pilots for dirigible crafts, and particularly for airplanes.

It is the principal object of this invention to produce an automatic pilot for maintaining the airplane on an even keel, at a constant altitude, and in a straight away direction, should the operator for any reason lose control of the airplane.

Another object of the present invention is the provision of an automatic pilot having means controlled by an altimeter to maintain the airplane at a substantially constant altitude.

Still another object of the invention is the provision of an automatic pilot having manually adjustable means to determine the angle of ascent or descent of an airplane and means controlled by an altimeter, whereby when a predetermined altitude has been attained, said adjustable means will be made inoperative, and the airplane will maintain a stabilized flying position.

A further object of the present invention is to provide an automatic pilot including liquid level electric switches, normally open when the airplane is in position, for horizontal flying and adapted to be closed when the airplane is in an inclined position, to cause servo-motors to be energized to operate stabilizing means, whereby the airplane is returned to the horizontal flying position.

Another object of the invention is the provision of an automatic pilot for airplanes having stabilizing means and a hand gripping control member having an electric switch associated therewith which is normally held open as the operator grips the control member, and permits the switch to close when the operator releases his grip whereby an electrically operated means functions to maintain said stabilizing means in proper relation to maintain said airplane at a substantially constant altitude, and in a straight-away direction.

A still further object of the invention is the provision of liquid level switches operable to control the circuits whereby the stabilizing means will operate to cause the airplane to roll, loop-the-loop, etc.

Other objects are simplicity of construction, accuracy and efficiency of operation, and adaptability to any type of dirigible crafts.

With these objects as well as other objects which will appear during the course of the specification, in view, reference will now be had to the drawings wherein:

Fig. 1 is a diagrammatic perspective view of an airplane showing the aileron mechanical control means embodying a portion of this invention.

Fig. 2 is a figure similar to that shown in Fig. 1 with the elevators and elevator controls shown.

Fig. 3 is a further figure similar to Fig. 1 with the rudder and rudder control means shown diagrammatically.

Fig. 14 is a face view of a combined climb and dive setting device and a bank and turn setting device.

Fig. 15 is a central section taken on line XV—XV of Fig. 14.

Fig. 16 is an enlarged sectional view taken on line XVI—XVI of Fig. 15.

Fig. 17 is a fragmentary sectional view taken on line XVII—XVII of Fig. 15.

Fig. 18 is a horizontal sectional view taken on line XVIII—XVIII of Fig. 15.

Fig. 19 is an enlarged detailed view of the cable damping means.

Fig. 20 is a diagrammatic view of the electric circuit.

Fig. 21 is an enlarged side elevation view of the hand gripping member and support frame.

Fig. 22 is a view of parts shown in Fig. 7 with the bevel driving gear in the inoperative position.

Fig. 23 is an enlarged sectional view of one of the mercury level switches.

Fig. 24 is a broken away elevated view of a liquid level switch for controlling the power current whereby the airplane is caused to loop-the-loop or roll.

Fig. 25 is a view of the switch shown in Fig. 21 partially rotated to change the position of the liquid contact without breaking the circuit.

Fig. 26 is a view of said switch showing a greater degree of turn whereby certain other circuits are closed.

Fig. 27 is a sectional view of the liquid level switch taken on line XXVII—XXVII of Fig. 24.

Figure 4:
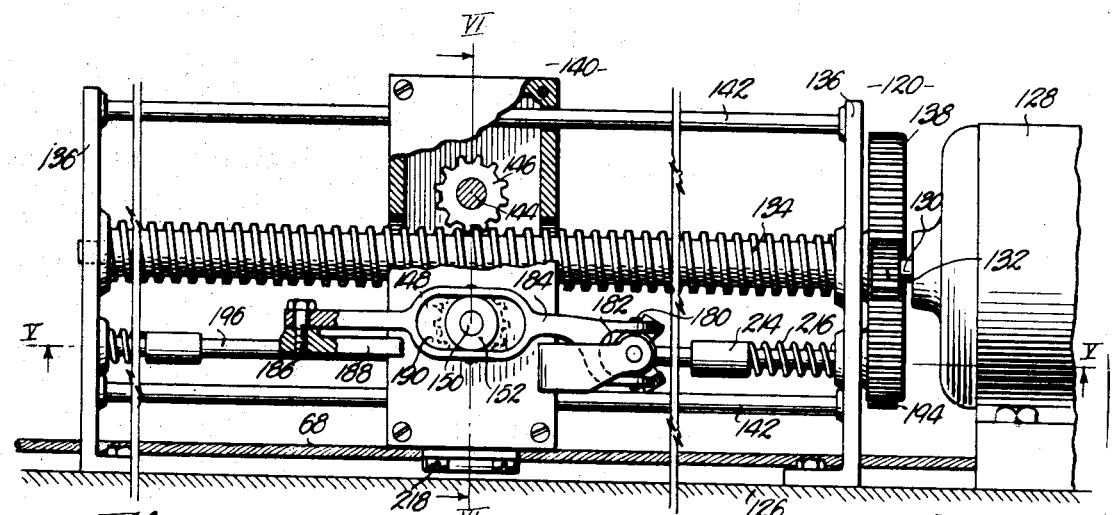
Fig. 4 is fragmentary elevation of the servo-motor driving means for the operating cables with parts broken away.
Figure 5:
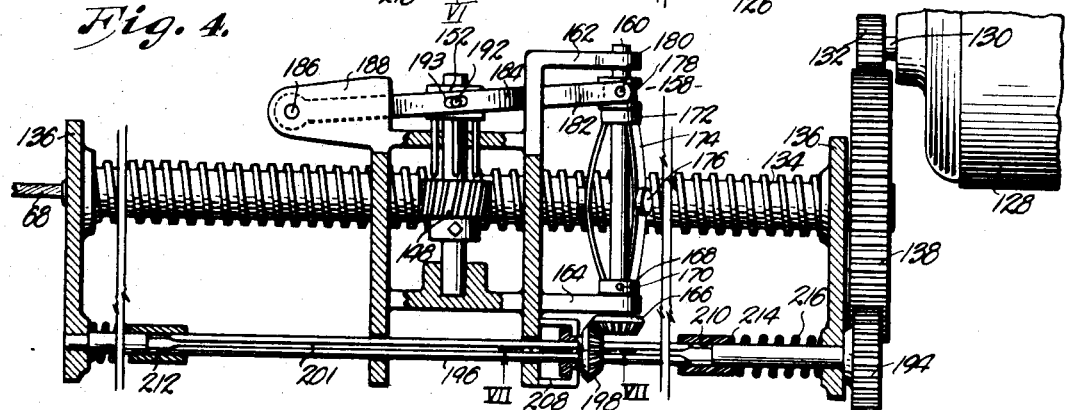
Fig. 5 is an inverted sectional view taken on line V—V of Fig. 4.

Throughout the several views like reference characters refer to similar parts and the numeral 30 designates an airplane of a standard make having a fuselage 32, wings 34 and 36. Ailerons 38 and 40 pivoted for hinged movement on axis disposed transversely of the plane are at the rear edge of wings 34 and 40 respectively, and are each provided with oppositely disposed horns 42 and 44. The upper horns 42 are joined together by cable 46 which is trained over pulleys 48 and 50 carried by stationary brackets 52. A hand-grip member or hand operated switch 54 is mounted for oscillation, longitudinally of the plane, on frame 56 which is pivoted at 58 to frame members 60 of the fuselage. It will be noted that member 54 is mounted on a shaft 62, mounted in bearings 64 carried by frame 56. A flanged drum 66 is rigidly secured for rotation with shaft 62 when the hand-grip member is rotated in either direction. A cable 68 is attached to horn 44 of aileron 38, extends over pulley 70, pulley 72, thence over pulley 74, axially disposed to frame 56, then about pulley 76 to drum 66 where it is attached so as to wind and unwind as the member 54 is turned on its axis. The other aileron 40 is controlled by a cable 78 attached at its one end to horn 44 and passing over pulleys 80, 82, 84 and 86 thence to the drum 66.

It will be noted that the cables 68 and 78 are wound in opposite directions about drum 66 so that as one is being wound thereon, the other will be unwound therefrom, thus causing the ailerons to be moved in opposite directions. This is the standard manual control means for the ailerons of the airplane and it is the purpose of this invention to provide automatic means which will take over and control the plane for stabilized flying whenever the operator releases the hand-grip control member 54 as hereinafter described.

The hand-grip member 54 is provided with two contact members 53 and 55 which are normally closed by the resilient contact member 57 which when gripped by the operator's hand will move inwardly against 54 to open one of the contacts to break the circuit. Contacts 53 and 55 are connected in series as shown.

For the purpose of clearness in showing the aileron, elevator and rudder controls, it will be noted that these controls are separately shown in Figs. 1, 2, and 3.

Fig. 2 shows the elevator controls. The elevators 88 and 90 are hingedly mounted at opposite sides of the fuselage at the rear end of the plane and adjustable to determine the degree of ascent and descent of the plane. Each elevator is provided with an upstanding horn 92 and a depending horn 94. A cable 96 secured to horn 92 of elevator 88 is connected with frame 56 below its pivotal point, and cable 98 is secured to the depending horn 94 of elevator 88 and is attached at 100 to frame 56 above pivotal point 58. In like manner cables 101 and 102 are secured respectively to horns 92 and 94 of elevator 90 thence to the pivoted frame 56. When thus connected the elevators will move in unison as the frame 56 is oscillated about its center 58.

Referring now to Fig. 3 wherein the rudder 104 mounted for oscillation about a vertically disposed axis at the rear of the airplane, it will be noted that side arms 106 and 108 disposed in opposite directions from the rudder are respectively connected by means of cables 110 and 112 to opposite ends of the foot bar control 114, which is pivoted at its center portion by pin 116 to the structural frame 118, so that, as the foot bar is oscillated, the rudder may be selectively moved to the right or left. It will be understood that the airplane structure above described is typical of the structures now in general use and that it is the purpose of the invention to augment this structure with further control means operable with said structure whereby the airplane is automatically piloted within certain limits hereinafter set forth.

Reference will now be had to servo-motor assemblies 120, 122 and 124 which respectively operate to control the ailerons, elevators and rudder. The field coils of these motors are respectively indicated as 121, 123 and 125. Since these servo-motors are substantially identical in structure, but one is shown in detail in Figs. 4, 5, 6 and 7. The servo-motor structure is secured to the plane frame work 126 and includes a reversible electric motor 128 having a driven shaft 130 on which is rigidly mounted a drive pinion 132. A worm shaft 134 disposed in parallel relation with drive shaft 130 and mounted for rotation in frame 136 is provided at one end with a spur gear 138 which intermeshes with drive pinion 132. Shaft 134 extends through a gear box 140 which in turn is slidably mounted on guide rods 142 disposed in parallel relation to shaft 134. A shaft 144 disposed at a right angle to shaft 134 and mounted for rotation in gear box 140 carries a worm wheel 146 which rests on the top side of shaft 134 to maintain the shaft 134 in proper engaging relation to the lower worm gear 148 mounted on transverse shaft 150 journaled in the gear box 140 with one end thereof extending therethrough to receive a sleeve 152 for longitudinal movement along said shaft. Sleeve 152 has a plurality of fingers 153 extending through openings 154 and adapted to engage in recesses 156 formed in the face of worm wheel 148 to secure it against rotation as the worm shaft 134 is rotated. It will be noted that shaft 150 is similarly grooved to receive pin 157 carried by worm gear 148 to prevent longitudinal movement thereof on the shaft. When the parts are in the position shown in Fig. 6 with fingers 153 disengaging recesses 156, the worm gear will idle on shaft 150 and there will be no resultant movement of the gear box, however when the fingers are inserted in the recesses of the gear, the gear will be secured against rotation relative to worm drive shaft 134 and the gear box will be moved along worm shaft 134 by the action of the threads, and the direction of movement will depend upon the direction of rotation of the electric motor 128.

When the electric motor has attained a predetermined speed, it is desired to secure worm gear 148 against rotation and this is accomplished by means of the following mechanism. A centrifugal governor 158 comprises a shaft 160 rotatably mounted in bearings 162 and 164 carried by gear box 140 and extends through bearing 164 to receive a bevel gear 166 for rotation therewith. A sleeve 168 secured by pin 170 to shaft 160 is joined to a slidably mounted sleeve 172, mounted on shaft 160, by means of flexible members 174 having centrally disposed weights 176 which, when the shaft 160 is rotated at a predetermined rate of speed, will cause sleeve 172 to move toward sleeve 168. Sleeve 172 is grooved at 178 to receive shifting pins 180 mounted in the bifurcated end 182 of shaft lever 184 which is pivoted at 186 to an ear 188 integral with gear box 140.

The central portion of lever 184 is enlarged and provided with an opening 190 to receive the sleeve 152. Radially disposed pins 192 carried by sleeve 152 extend through slots 193 formed through lever 184, whereby as the lever is moved by the action of the governor 158 the pins 153 will be moved to and from the operative position in recesses 156 to control the worm gear 148. The governor is driven by gear 138 through pinion 194, rigidly mounted on shaft 196 which is mounted for rotation in frame 120, in parallel relation with worm shaft 134, and has a bevel gear 198 carried for rotation therewith disposed in driving relation with bevel gear 166. Bevel gear 198 is slidably fixed to shaft 196 by splines 200 which ride in grooves 201 formed in shaft 196. To prevent the gear box and attached parts from traveling too far along worm drive shaft 134, stop mechanism is provided at each end portion of shaft 196 to make inoperative the governor to release the worm gear 148 for rotation.

Figures 6, 7:
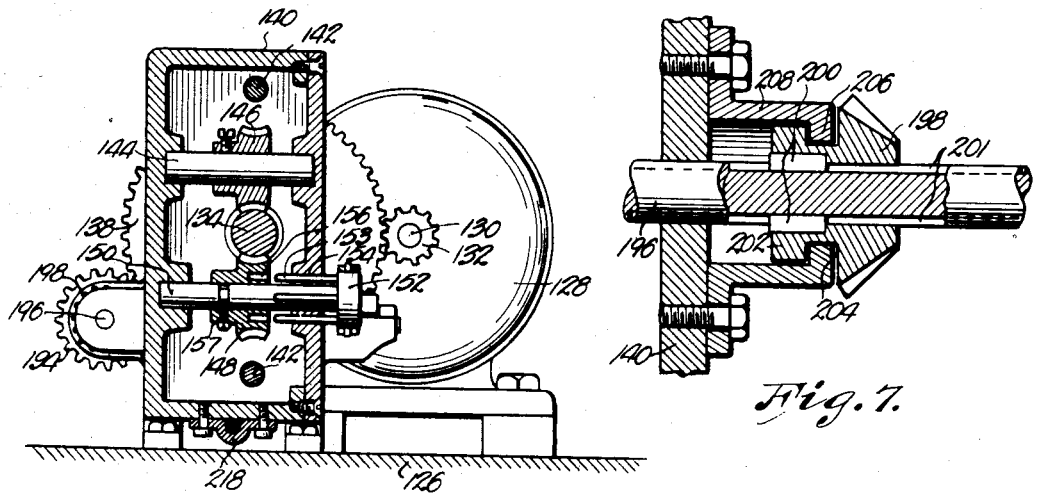
Fig. 6 is a cross sectional view taken on line VI—VI of Fig. 4.
Fig. 7 is a detailed section taken on line VII—VII of Fig. 5.
Figure 8:
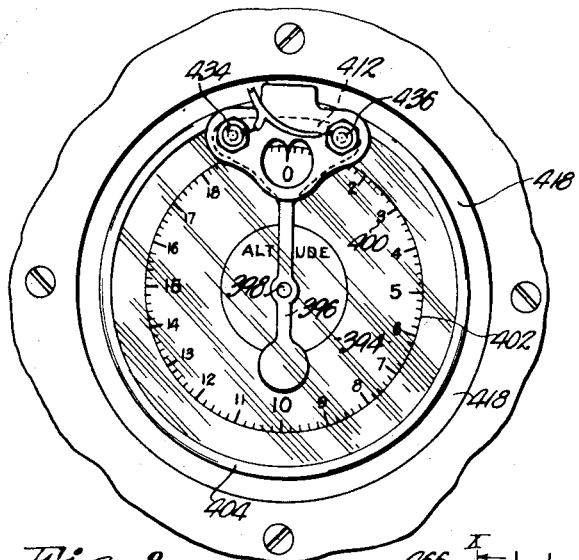
Fig. 8 is a face view of an altimeter with special electric control means operated thereby.

Referring to Figs. 7 and 26, it will be noted that the hub 202 of gear 198 is annularly grooved at 204 to receive the flange 206 of housing 208 whereby it is secured to the gear box 140.

The shaft 196 has annular grooves 210 and 212 respectively adjacent its opposite ends. Furthermore, the grooves terminate at these annular grooves and are flared to make easy entrance for the splines. When the gear box 140 and attached parts are moved along worm shaft 134 by motor 128, the governor will operate to cause the worm gear 148 to hold against rotation until, for example, the splines 200 are moved into the annular groove 210, at one end of the shaft, when the gear 198 will become inoperative to drive the governor, so that it will move to its normal position and cause the pins 153 to move from their engagement with gear 148, to prevent further movement of the gear box along worm shaft 134. A sleeve 214 slidably mounted on shaft 196 is positioned from frame 136 by a compression spring 216 and is so spaced that when the parts are moved to the position shown in Fig. 22, the spring will be compressed, to exert a pressure on the gear and associated parts to return the splines to the grooves 200 as the motor is reversed to turn worm shaft 134 in the opposite direction. Due to the fact that the governor is at rest when the gear 198 becomes inoperative it is possible for the compressed spring 216 to force the gear and splines 200 into the operative position in grooves 201. The cable 68 or any of the other operating cables referred to above, is secured to the gear box 140 by means of a clamp member 218, so that as the gear box is moved, the cable will be operated to cause the associated stabilizing or guiding means to operate.

Means for preventing sudden movements of the operating cables is shown in Fig. 19. The aileron, elevators and rudder control cable systems are each provided with at least one of these damping means. The damping means comprises two dash-pots 220 and 222 of like construction, and disposed in opposite directions relative to the movement of the cable 46, by means of which they are operated. Dash-pot cylinder 221 is pivotally mounted at one end by pin 225 to a standard 226 carried by a structural member 228 of the airplane in substantially parallel relation with the operating cable 46. A plunger rod 230 extends through guide sleeve 232 and is provided at its inner end with piston valve 234 which tends to compress the air in the cylinder 221 as it moves inwardly. An arm 236 adjustably secured to rod 230 has an opening 238 through which the cable 46 passes. An operating block 240 adjustably secured to cable 46 by means of set-screw 241, engages arm 236 to operate rod 230 and compress spring 242 which is positioned in cylinder 221 between piston valve 234 and guide sleeve 232. A bleed-hole 244 serves to admit air to the cylinder as the piston is moved outwardly, and is controlled by a remote-control valve 246 located at the outer end of a conduit 248 which communicates with bleed hole 244. This control valve can be set to regulate the flow of air from cylinder 221 as driving means for cable 46 is released and the compressed spring 242 returns the piston to its normal position. The speed of return of the piston 234 can be easily regulated by simply adjusting valve 246, which is positioned in convenient reach of the operator. When the cable 46 is operated in the reverse direction, the dash-pot 220 is idle and dash-pot 222 comes into use, through the action of operating block 247, and the flow of air through conduit 250 is controlled by valve 252. While this damping means has been shown in certain positions in the several cable systems, yet it is apparent that they may be placed wherever they will function to prevent too rapid return movement of the cables, after the servo-motors have set the stabilizing or guiding means. These damping means are intended to be set to produce movements of the stabilizing parts similar to those produced by the hand-operating means.

Reference will now be had to Figs. 14, 15, 16, 17 and 18 showing the mechanical means for manually controlling and setting the liquid level contacts whereby the certain electrical devices are controlled to determine the flying position of the airplane. These liquid level switches are positioned in relation to pre-determined airplane positions with relation to the horizontal, so that as the plane deviates from such positions the switches will operate to cause certain conditions in electric circuits whereby servo-motors will be energized to return the plane to the said pre-determined position.

A housing 258 is constructed to contain both the altitude liquid level control 256 and the turn and bank liquid level control 257 and is adapted to be fixed to the airplane structure convenient to the operator.

The altitude liquid level switches, 260 and 262 are separately mounted on their respective tables 264 pivotally carried by arms 266 which are in turn pivoted at 268 to housing 258. The tables are independently adjustable relative to their respective carrying arms by means of screws 270. By loosening one of the screws and tightening the other, the mercury switch can be set and secured in any desired position relative to its carrying arm. Carrying arm 266 for switch 260 is interconnected with rack bar 272 by link 274 and the arm 266 for switch 262 is connected with rack bar 276 by link 278. Rack bars 272 and 276 are disposed in parallel relation in a guide plate 280 with the teeth thereon facing each other so that the spur gear 282 rigidly mounted on shaft 284 extends through bearing 288 and is provided with a fixed bevel gear 290, which intermeshes with a bevel gear 292 carried by shaft 294 mounted for rotation in fixed bearing 296, and provided at its upper extremity with a bevel gear 298 which is in operative relation with a relatively large segmental gear 300, pivoted at 302 to bracket 304 and having a radially disposed arm 306 which extends through a slot 308 formed through the arcuate portion 310 of housing 258. Arm 306 is provided with a double pointer head 312 which indicates the position of the liquid level switches 260 and 262 on the graduated scales 314. As the head 312 is moved upwardly from the neutral or "0" position, the liquid level switches will be so set that the airplane will be caused to dive, and when moved downwardly the plane will climb. The reverse action might be made by a few simple changes in the wiring circuit which will be described. Furthermore, as hereinafter described, it is possible to set switches 260 and 262 and to determine the up or down movement by the altimeter.

In the lower portion of housing 258 is mounted the manually controlled turn and bank mechanism 257 by means of which the liquid level switches 316, 318 and 320 are controlled. A carrying bracket 322 having axially disposed trunnions 324 and 326 are mounted for rotation in bearings 328 and 330. Trunnion 326 of bracket 322 is tubular in form and is adapted to receive the tubular trunnion 332 of table 334, which has a forward trunnion 336 which is mounted in a recess bearing 338 formed in bracket 322. The bracket and table trunnions are inaxial alignment. Table 334 is provided with laterally disposed ears 340 carrying adjusting screws 342 by means of which the table is adjusted on its trunnions. The mercury switches are secured in fixed position on table 322 by means of cap plate 344. An operating shaft 346 journaled in housing 258 extends through the housing and is provided at its inner end portion with a spur gear 348 which is disposed in operative relation with spur gear 350 fixed to trunnion 324. The outer end of shaft 346 is provided with hand-operable head 352 having diametrically disposed indicating pointers 354 which align with graduated scales 356 to indicate the direction and degree of turn or bank. Wires may be positioned through trunnion opening 357 for the mercury switches.

An operating arm 358, best shown in Figs. 15 and 16 is secured to trunnion 346 to operate a triple electric switch 360. This triple switch 360 comprises a housing 362 insulated from housing 258 by plate 364 and having a transverse partition 366 with a central hole 368 formed therethrough in vertical alignment with a similar hole 370 in the upper wall of housing 362. A plunger 372 extends through these holes to contact a resilient tongue 374 mounted at its one end on post 376 and having three insulated contact points 378, 380, and 382 carried by its free end. The plunger 372 is normally held by compression spring 384 positioned between partition 366 and a skirt 386 carried by plunger 372 in the raised position and the resilient tongue 374 will cause contact points 380 and 382 to respectively contact points 388 and 390. When the operating arm 358 contacts plunger 372 as shown, the tongue 374 will be depressed so that contact point 378 engages point 392 and the other two sets of contacts will be open. These parts and their functioning will be further described in conjunction with the description of circuit and the general operating of the automatic pilot.

It is one of the principal objects of this invention to automatically maintain the airplane at a desired, predetermined altitude of flight and for this purpose the following altimeter controlled mechanism is provided. A standard altimeter 394 having an indicating pointer 396 which indicates the altitude of flight as it turns on its axis 398 to register with the indicia 400 on the calibrated scale 402. The operation of the altimeter is well known and therefore the operating parts are not shown.

The annular flange 404 extends outwardly from the body of the altimeter housing and comprises spaced-apart transparent walls 406 and 408 to form an annular groove 410 into which the broadened end portions 412 of indicating points 396 extends for free movement therein. A tubular shaft 414 disposed in alignment with the axis of indicator 396 is fixed to the housing of the altimeter to extend rearwardly thereof and carries a cup-shaped housing 416, which extends forwardly to house the altimeter 394 and is spaced apart from the annular flange 404 to present an annular space 418 therebetween. A sleeve 420 of electrical insulating material is mounted for rotation on shaft 414 and carries a bracket 422 having a U-shaped end portion 424 which straddles the rim 404. The body of the U-shaped member 424 extends through annular space 418 and has an inner arm 426 and an outer arm 428. The inner arm 426 carries spaced-apart electric light bulbs 430 and 432 and the outer arm 428 carries photo-electric cells 434 and 436 which are in respective alignment with the bulbs 430 and 432 with the end portion 412 of indicator 396 normally positioned therebetween to make inoperative the photo-electric cells for level flying. Should the altimeter operate to move 412 to a position between the bulbs and the photo-electric cells when the device has been set for a different flying elevation, as hereinafter described, then the plane will level off when it has attained said elevation and will fly at a substantially constant altitude until such time as the device has been again set for a different altitude. Sleeve 420 is enlarged at 435 and provided with an annular groove 437, in which is mounted contact points 438 and 440 electrically interconnected by wire 442. A ring member 444 made of electrical insulating material is rotatably mounted on tubular shaft 414 and urged against the end of sleeve 420 by means of compression spring 446 mounted on shaft 414 between the nut 448, adjustably mounted for movement along threads 450, and a washer 452 which is slidably mounted on tubular shaft 414 to bear against ring member 444. A key 454 may be provided to prevent rotary movement of washer 452 on shaft 414. Spaced apart contact rings 456 and 458 are adapted to be contacted by brushes 460 and 462 respectively mounted in an insulating block 464 carried by bracket 466 which is secured to housing 416. Spaced apart contact points 468 and 470 are carried by ring member 444 in operative relations with points 438 and 440 respectively. It will be noted that the points are so positioned relative to each other that when one set of points is closed the other will be opened, furthermore only an extremely slight rotary movement of the sleeve 420 in either direction is required to change from the closing of one of the sets of contacts to the closing of the other. When setting the arm 422 one of the points 438 or 440 will engage the adjacent point to rotate the ring member about the tubular shaft 414 against the action of spring 446. To allow free movement of the adjustable arm 422 without interfering with the wiring, as hereinafter described, ring contacts 471, 473, 475, 477, 479 and 481 are provided as clearly shown in Fig. 9 with the usual ring and follow-up contacts. As an example of the general operation of this device it will be considered that the airplane is traveling at the elevation of 1000 feet and it is desired to change the elevation of flying to 2000 foot position, so that as the plane is elevated to the two thousand foot level the indicating points portion 412 will intercept the light to the photoelectric cells and the airplane will be leveled off and maintained at said 2000 foot level by the action of the altimeter in conjunction with the photo-electric cell controlled servo-motors.

The mercury switches 316, 318, 320, 260, and 262 are alike in construction and as shown in Fig. 23 each has an ellipsoidal housing 472 of substantially elliptical longitudinal form and of circular cross section made of an electric insulative material.

Each end portion 474 and 476 has a pair of spaced apart contacts protruding into said housing and terminating on the outside thereof for connection with conductors. A mass of mercury 478 positioned within the housing is adapted to rest adjacent the longitudinal center portion of the ellipsoidal housing when the major axis is in a substantially horizontal position and to move to one end thereof to join together the two contact points when the ellipsoid is tilted through a pre-determined arc.

Another form of liquid level switch shown in Figs. 24, 25, 26, 27 constitutes a body member 480 slotted at 482 and secured to a member 484 of the airplane by means of screws 486. By loosening the screws the body member 480 may be adjusted about its axis. The member 480 is preferably made of two similar members securely joined together and provided with a recess 488 extending inwardly from adjacent the periphery thereof to form pockets 490, 492, and 494, with pocket 494 terminating adjacent the center of member 480. A pair of spaced apart contact members 496 and 498 extends inwardly through insulating blocks 500, thence through pocket 490 and into pocket 492. A mass of liquid conductor 502, such as mercury is positioned in said recess 488 for free movement therein as the member 480 is rotated about its axis. The inner compartment 494 is provided with two contact points 504 and 506 with conductors leading therefrom to the outside of said member 480.

In Fig. 24 the liquid level switch is in the normal position with the airplane in the substantially horizontal position. As the airplane turns through 90° the switch will take the position shown in Fig. 25 and the circuit leading from contact members 496 and 498 will be maintained closed since these conductors are adjacent the outer wall of recess 488 along which the mercury 502 travels as the switch rotates with the airplane in the direction indicated by the arrow. In Fig. 26 the switch has rotated through an arc sufficient to move the mercury into the inner pocket 494 to close contact points 504 and 506 and to open contact members 496 and 498. In the operation of the airplane in rolling or looping the switch will be rotated a still further degree and the mercury 502 will be deposited in pocket 490 and the points 504 and 506 will be opened and the conductors 496 and 498 will be again closed. This form of liquid switch is adapted for use in controlling the stabilizing means for special flying and is adapted for use in the circuit shown in Fig. 20.

Reference will now be had to the diagrammatic electric circuit drawing shown in Fig. 20. This circuit is shown with the control members set for the airplane to ascend to a pre-determined level and to level off to fly at a substantially constant altitude under the control of the automatic pilot.

It will be noted that the hand grip member 54 has been released by the operator so that the resilient contact member 57 has moved outwardly to close contact members 53 and 55. These contacts 53 and 55 are connected in series by resilient contact member 57 so that when either one of the contacts are open the controlled circuit will be open. The positive line 510 of the power line for the pilot is broken with the ends thereof connected with the contacts 53 and 55 so that the power current must pass through the resilient contact member 57 from an electrical source of supply 511. The negative wire 512 of the power line is continuous from the source of power, not shown.

A series of switches 514, 516, 518, 520, 522, and 524 carried by a common support 526 and operated by an electromagnet 528 through the means of a bell-crank lever 530 pivot at 532 and an operating bar 534 having transverse pins 536 to engage and move a certain contact member of each of said switches. It will be noted that the electro-magnet 528 is energized to move the bell-crank lever 530, which serves as an armature to adjust the switches of the series so that switches 514, 520, 522 and 524 are closed and switches 516 and 518 are open. When the electro-magnet is de-energized the spring 538 will force bar 534 downwardly to close switches 516 and 518 and to open switches 514, 520, 522, and 524. Another series of switches 540, 542, 544, 546, 548 and 550, mounted on support 552 and operated by electro-magnet 554 through bell-crank lever 556 and operating bar 558, is shown with the electro-magnet energized, whereby switches 540, 546, 548 and 550 are closed and switches 542 and 544 are open. When electromagnet 554 is de-energized then the spring 562 will operate to open switches 540, 546, 548, and 550 and to close switches 542 and 544. A further set of electro-magnetically operated switches 564, 566 and 568 are adapted to be operated by electro-magnet 570 through bell-crank 572 and operating bar 574. The electro-magnet 570 is de-energized and the spring 276 is holding the switches 564, 566 and 568 in the open position, furthermore when the electro-magnet is energized the switches will all be moved to the closed position. A set of switches 576, 578 and 580 are normally held in the open position by means of spring 584 attached to the bell-crank armature 586 which is adapted to move switch operating bar 588 when the electro-magnetic coil 590 is energized as shown in the drawings to close the switches.

Relay 592 comprises an electro-magnet 594 and contact armature 596 of limited travel and a stationary contact 598 in path of travel of said armature. A similar relay 600 consists of electro-magnet 602, contact armature 604 and stationary point 606 mounted in the path of travel of said armature. When either of the electro-magnets are energized their respective circuits are closed and when the electro-magnets are de-energized the circuits are open. A source of electric power, such as battery 608, is provided to energize the electro-magnets as hereinafter set forth.

Figure 12:
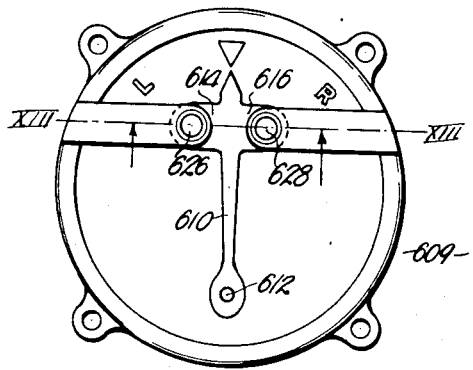
Fig. 12 is a face view of a turn indicator with photoelectric cells controlled thereby.
Figure 13:
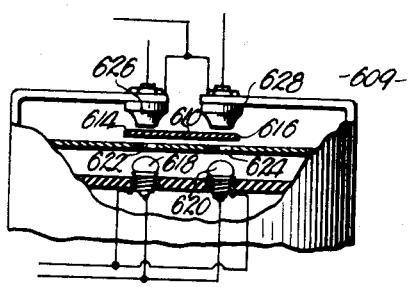
Fig. 13 is a fragmentary sectional view taken on line XIII—XIII of Fig. 12 with a diagrammatic showing of wires connected therewith.

A standard turn indicator 609 shown in Figs. 12, 13 and 20 having the usual gyroscopic controlled needle 610 pivoted at 612 is provided with transversely disposed ears 614 and 616 adjacent its free end. These ears 614 and 616 are adapted to intercept light from bulbs 618 and 620 which are positioned, as shown to shine through openings 622 and 624 to respectively energize photo-electric cells 626 and 628. When needle 610 is in the position shown in Figs. 12 and 13 no light will enter the photo-electric cells from the bulbs, however, should the plane deviate a pre-determined degree from the straight course the turn indicator and parts secured thereto will move transversely of the needle to admit light to one of the photo-electric cells which will operate to energize motor 124 and cause the rudder to be adjusted to bring the plane back to said straight course. When the plane is guided back to the straight course the turn indicator will move back to the normal position to cause the needle projections to cover opening 622 or 624 as the case may be. It is quite evident that a deviation to the right will necessarily cause the rudder to operate in one direction while a deviation in the opposite direction will cause the rudder to operate in the reverse direction.

Relays 630 and 632 are controlled by photoelectric cells 626 and 628 which are energized by electric current from any suitable source, such as battery 634. Relay 630 has an armature contact 636, coil 638 and contact point 640. In Fig. 20 the relay 630 is shown open. Relay 632 comprises a coil 642, contact armature 644 and stationary contact point 646. The turn indicator 609 with associate parts also relays 630 and 632 function to cause the rudder to operate and hold the airplane in a substantially straight course.

As a further means to properly direct the electric current to servo-motor 124 for operating rudder 104 two electro-magnetically operated series of switches 648 and 650 are provided. Series 648 comprises switches 652, 654, 656, 658 and 660 carried by member 662. An electro-magnet 664 operates bell-crank armature 666 to move operating bar 668 which is adapted to operate switches 652 and 654 in reverse direction to switches 656, 658 and 660. The switches are normally held as shown by spring 661. The series 650 comprises switches 670, 672, 674, 676, and 678 mounted on member 680. An electro-magnet 682 is shown energized to oscillate the bell-crank armature 684 to operate operating bar 686 and move switches 670 and 672 to the open position and switches 674, 676 and 678 to the closed position. The spring 688 normally holds the operating bar in the down position to close switches 670 and 672 and to open switches 674, 676 and 678.

A standard delay switch 690 having contact arms 692 and 694 normally spaced apart by the action of the electrical resistance bar 696 and adapted to be moved together to close the switch as current is fed to bar 696 to raise its temperature and cause it to expand. This delay switch is shown to operate in conjunction with servomotor 120, however one may be used to delay the action of the motors 122 and 124 also.

The wiring connections between the switches, relays, electro-magnets, photo-electric cells, light bulbs, etc., as shown in Fig. 20 will now be described.

The photoelectric cell 434 is connected by wire 700 to ring contact 471, wire 702 to electro-magnet 602 then by wire 704 to battery 608 and by wire 706 to ring contact 473, thence by wire 708 to the other terminal of the photo-electric cell 434. One terminal of photo-electric cell 436 is connected by wire 710 to wire 708 and the other terminal thereof is connected by wire 712 to contact ring 475, which in turn is connected by wire 714 to electro-magnet 594, thence by wire 716 to wire 704. The light bulb 432 is inter-connected by wire 718 through contact ring 477 to the positive feed line 510. The other terminal of lamp 432 is connected by wire 720 through ring contact 479 to the negative feed line 512. Light bulb 430 is connected in multiple with lamp 432 to wires 718 and 720.

The electro-magnets 594 and 602 are shown energized with the respective armatures 596 and 604 thereof moved to contact their respective contact points 598 and 606. Contact point 606 is connected by wire 722 to one side of magnet coil 528 and armature 604 is joined to the positive feed wire 510 by wire 724. Magnet coil 528 is joined to magnet coil 554 by wire 726 which in turn is joined by wire 728 to negative wire 720. The other side of magnet coil 554 is connected by wire 730 to contact 598. Wire 732 connects armature 596 with wire 724.

The servo-motor 122 and also the motors 120 and 124 are reversing shunt-wound motors and it will be noted that in the diagrammatic showing in Fig. 20, 122 designates the rotor and 123 the field winding of the motor. The positive side of the motor 122 is connected by wire 734 through wire 718 to the positive feed wire 510.

Referring now to the field coil 123, through which it is desired to pass the current in opposite directions to reverse the motor, it will be noted that the wire 736 is connected through switch 564 to wire 720 to connect with terminal 738 of field coil 123. Terminal 738 is also connected by wire 740 through switch 576 to the positive feed wire 510. The other terminal 742 of field coil 123 is connected by wire 744 through switch 566 to positive wire 718 to feed wire 510. Terminal 742 is also connected by wire 746 to one terminal of switch 578 while the other terminal of 578 is connected by wire 748 to the negative feed wire 512. The negative side of the rotor of motor 122 is connected by wire 750 through switch 524 to wire 720 which joins the negative feed wire 512. Wire 752 connects with wire 750 to one terminal of switch 550 which is connected at its other terminal by wire 754 to wire 748 connected with the negative feed wire 512. Wire 756 joins wire 750 and connects it with one terminal of switch 568 while the other terminal of said switch is connected by wire 758 to wire 720. One terminal of switch 522 is connected by wire 760 to wire 744 while the other terminal of said switch is connected by wire 762 to one terminal of switch 544 and the other terminal of switch 544 is joined to wire 740 by wire 764. Wire 766 joins one terminal of switch 520 with wire 736 and the other terminal of said switch is connected by wire 768 to one terminal of switch 542 while the other terminal thereof is connected by wire 770 to wire 748 which in turn is connected with negative feed wire 512. One terminal of switch 516 joins wire 718 through wire 772 while the other terminal thereof is connected by wire 774 to one terminal of switch 546 while the other terminal thereof is joined to wire 740 by wire 776. One side of switch 548 is connected by wire 751 to wire 746 and the other side of switch 548 is joined by wire 753 to one side of switch 518 while the other side of said switch is joined by wire 755 to wire 720 connected to negative feed wire 512.

Wire 778 joins one terminal of switch 514 with wire 718 while the other terminal thereof is connected by wire 780 to one terminal of switch 548 and the other terminal of switch 548 is connected by wire 782 through ring contact 481 to wire 442 which is common to contact points 438 and 440. Contact point 468 adapted to close the circuit point 438 is connected through wire 784 to ring contact 458 thence through wire 786 to one point of switch 787 of liquid level switch 260 while the other point thereof is connected by wire 788 to one side of the electro-magnet 590. The other terminal of electro-magnet 590 is connected by wire 790 to wire 748 which in turn is connected with negative feed wire 512. Wire 792 connected to wire 786 contacts one of the points of switch 793 of liquid level switch 260 while companion terminal thereof is connected through wire 794 to one terminal of electro-magnet 570 and the other terminal of said electro-magnet is connected by wire 796 to wire 788. One terminal of switch 797 at one end of liquid level switch 252 is connected by wire 798 through ring contact 456, wire 800 to contact point 470. The anode of photo-electric cell 626 is connected by wire 808 with one terminal of electro-magnet 638 while the other terminal thereof is connected by wire 810 with contact point 392 of switch 374 having its other terminal connected by wire 812 to one terminal of battery 634 while the other terminal of said battery is joined by wire 814 to the cathode of photo-electric cell 626. The anode of photo-electric cell 628 is joined by wire 816 to one terminal of electro-magnet 642 while the other terminal thereof is connected by wire 818 to wire 810. The cathode of photo-electric cell 628 is joined by wire 820 to wire 814.

One terminal of light bulb 620 is connected by wire 822 to the positive feed wire 510 and the other terminal thereto is connected by wire 824 to the negative feed wire 512. Light bulb 618 is connected in multiple with light bulb 620 by wires 824 and 822. When photo-electric cell 628 is energized, as shown, the electro-magnet 642 will move armature 644 against contact 646. This contact is connected by wire 826 which joins with one terminal of electro-magnet 632 while the other terminal of said magnet is connected by wire 828 to wire 824 which in turn is connected with the negative feed wire 512. The other relay 630 has a contact member 640 which is contacted by armature 636 when the electro-magnet 638 is energized. This contact 640 is connected by wire 830 to one pole of electro-magnet 664 while the other pole is connected by wire 832 to wire 828. Wire 834 is common to both armature contact members 644 and 636 to connect them to wire 822 which joins the positive feed wire 510. Wire 836 joins wire 830 with contact 388 of a switch having a cooperating contact point 380 which is joined by wire 838 to wire 866. Wire 840 serves to connect wire 826 with contact point 390 of a switch having a contact point 382 in operative relation therewith which in turn is connected by wire 842 to one pole of switch 843 of liquid level switch 318. The other pole of switch 843 is joined by wire 844 to the positive feed wire 510. One terminal of the rotor of motor 120 is connected by wire 846 to the positive feed wire while the other terminal thereof is connected by wire 848 to one terminal of switch 849 of liquid level switch 320. The other terminal of switch 849 is connected by wire 850 to wire 856 which is connected with negative feed wire 512. A wire 852 connects with wire 848 to connect with one terminal of switch 853 of liquid level switch 320 while the other terminal thereof is connected by wire 854 to wire 856. One of the terminals of switch 855 of liquid level switch 316 is connected by wire 856 with the negative feed wire 512. The other terminal of switch 855 is connected by wire 858 to one of the switch arms 692 to time delay switch 690 while the other switch member 694 is connected by wire 860 to one terminal of the field coil 121. The other terminal of field coil 121 is connected by wire 862 to one terminal of switch 863 of liquid level switch 318 while the other terminal thereof is joined by wire 864 to wire 856. Switch member 692 is also connected by wire 866 to one terminal of switch 867 of liquid level switch 316. Wire 868 connects the other terminal of switch 867 with wire 844. Wire 869 joins the lower terminal of field coil 121 with the wire 842.

One rotor pole of motor 124 is connected by wire 870 to the positive feed wire 510 while the other pole thereof is connected by wire 872 to one of the terminals of switch 678 while the other terminal thereof is connected by wire 874 to wire 876 joining one terminal of switch 660 to wire 824 which connects with negative feed wire 512. The other terminal of switch 660 is connected by wire 878 to wire 872. One terminal of field coil 125 is joined by wire 880 to one terminal of switch 674 and the other terminal of said switch is connected by wire 882 to one arm of switch 652 while the other arm thereof is connected by wire 884 to wire 822. The same terminal of field coil 125 is connected by wire 886 to one terminal of switch 656 and the other terminal of said switch is connected by wire 888 to one terminal of switch 670 while the other terminal of this switch is connected by wire 890 to wire 824 connected with the negative feed wire 512. The other terminal of field coil 125 is connected by wire 892 to one terminal of switch 676 while the other terminal thereof is connected by wire 894 to one terminal of switch 654 having its other terminal connected by wire 896 to wire 824. Also connected to the same terminal of field coil 125 is a wire 898 which joins one terminal of switch 658 and the other terminal thereof is connected by wire 900 to one terminal of 672 while the other terminal of 672 is connected by wire 902 to wire 822 which joins with the positive feed wire 510.

This diagrammatic electric circuit, just described and shown in Fig. 20, indicates a setting of the control elements to cause the airplane to ascend to a predetermined level and then to level off and maintain a substantially constant altitude under the control of the automatic pilot.

It will be noted that the contact member 57 of the hand-gripping means 54 has moved to the contact position with contact points 53 and 55 so that electric current to the feed wires 510 and 512 are constantly energized to supply power to the parts of the automatic pilot. The reversible servo-motor 122 is to be controlled to regulate the elevators 88 and 90 to determine the angle of ascent or descent and also to make corrections for level flying.

Figures 9, 11:
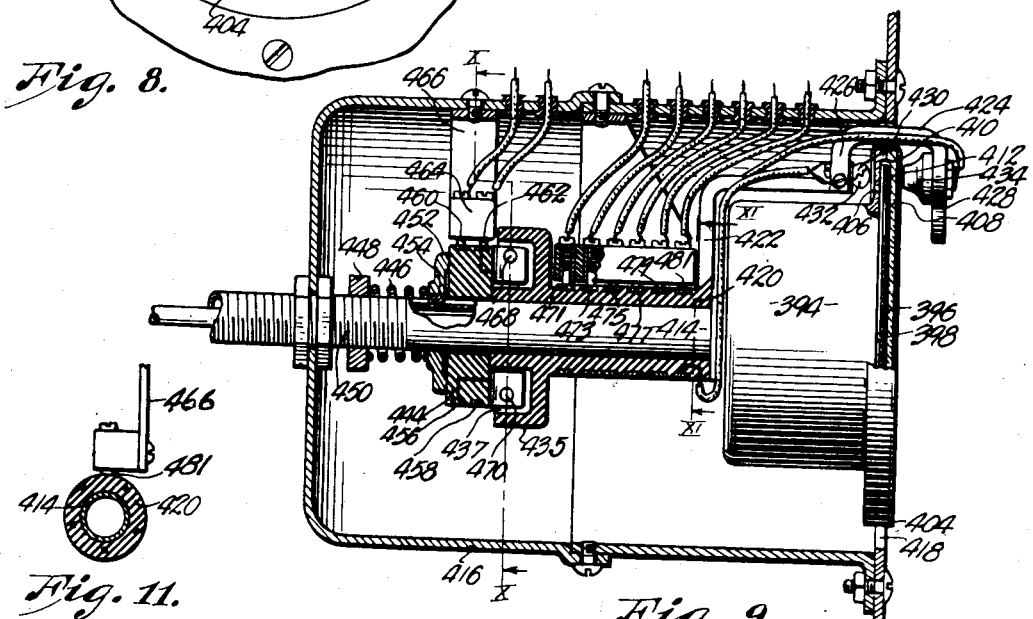
Fig. 9 is a sectional view taken axially of Fig. 10 with some of the parts left in elevation.
Fig. 11 is a cross sectional view taken on line XI—XI of Fig. 9.
Figure 10:
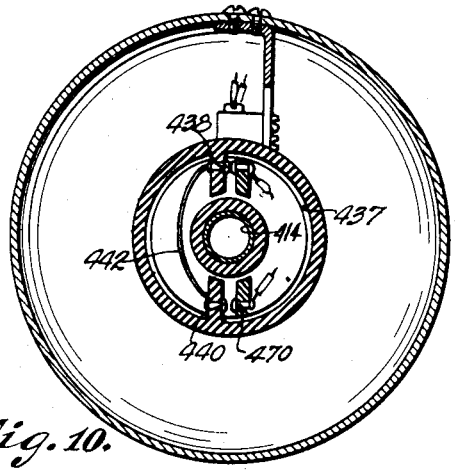
Fig. 10 is a cross sectional view taken on line X—X of Fig. 9.

When the plane is traveling at a given altitude and it is desired to increase the altitude to a pre-determined height then the operator sets the arm 422, shown in Fig. 9, to a position on the scale 402 to indicate the desired altitude to be attained. This setting moves the photo-electric cells. Furthermore, the operator sets the indicator pointers 312 to properly set the liquid level switches 260 and 262 for the degree of climb required. With the setting of arm 422 the contact pointers 438 and 468 will be closed and points 440 and 470 will be open.

With the liquid level switches 260 and 262 relatively inclined as shown the switches 787 and 801 will be closed and switches 793 and 797 will be open. So long as member 412 is not positioned to intercept the light bulb from photo-electric cells 434 and 436 the electro-magnets 594 and 602 will be energized to close the contact points 598 and 606. One side of the lamps 430 and 432 are connected by wire 718 through ring 477 to the positive feed wire 510 and the other connections to lights 430 and 432 are by wire 720 through ring 479 to the negative feed wire 512. The light from bulb 430 operates photo-electric cell 434 so that the current passes by wire 700, ring 471, wire 702 through electro-magnet 602, wire 704, to one terminal of battery to 608, thence by wire 706 through ring 473, wire 708 to the anode of the photo-electric cell 434.

Likewise, light 432 actuates photo-electric cell 436 so that a current passes from the anode thereof through wire 712, ring 475, wire 714, through electro-magnet 594, to connect with one pole of battery 608 through wires 716 and 704. The other pole of the battery 608 being connected by wire 706 through ring 473 to wire 708, thence by wire 710 to the cathode of photo-electric cell 436. Since both of the electro-magnets 594 and 602 are energized, armature 596 will be in contact with point 598 and armature 604 will be in contact with point 606 to close the circuits.

Current from the positive feed wire 510 passes through wires 718, wire 724, armature 604 to wire 722 through electro-magnet 528, wire 726, electro-magnet 554, wire 730 through point 598, armature 596, wire 732, wire 724. Wire 726 joining the electro-magnets 528 and 554 is joined by wire 728 to wire 720 leading to the negative feed wire 512. It will be noted that both the electro-magnets 528 and 554 are energized with the liquid level switches 260 and 262 positioned as shown with switch 787 and switch 801 closed. The electric current from positive feed wire 510 will pass through wire 718, wire 778, switch 514, wire 780, switch 540, wire 782, through ring 481, wire 782, wire 442, contact point 438, to contact point 468, to wire 784, through ring contact 458, to wire 786, through closed switch 787, to wire 788, thence through electro-magnet 590, which closes switches 576, 578 and 580, thence through wire 790, to wire 748, which joins with the negative feed wire 512.

When so connected, the current from the negative wire 512 passes through wire 748, switch 578, wire 746, to the field coil 123 of motor 122, thence to wire 740, through switch 516, to wire 740 which connects with the positive feed wire 510. The direction of flow of the current through the field coil 123 will determine the direction of rotation of the rotor of motor 122 to be moving the elevators in the direction for an ascent of the plane. When the liquid level switches 260 and 262 are tilted in the opposite direction then the direction of current flow, through field coil 123, will be reversed and the elevators will be operated in the reverse direction to cause a descent or dive of the airplane. Should it be desired to operate the elevators for a climb or dive by means of the altimeter the operator simply turns the arm 422 to the desired position, thereby selectively closing contact points 438 and 468 or the contact points 440 and 470. As stated above, when the contact points 438 and 468 are closed and the switches 787 and 801 are closed the airplane will be caused to climb. In order to reverse the direction from a climb to a dive the operator simply opens contact points 438 and 468 and closes contact points 440 and 470.

When the airplane has attained the elevation, as indicated by the altimeter, then the opaque member 412 will be positioned to intercept the light from light bulbs 430 and 432 to the respective photo-electric cells, which will open circuit to electro-magnets 528 and 554 thus opening circuit source to electro-magnets 570 and 590 through mercury switches. The airplane will now travel at a pre-determined altitude and should the plane move above or below this altitude then 412 will move out of alignment with one of the light bulbs 430 or 432 to energize the corresponding photo-electric cell thereby causing the motor 122 to rotate in the proper direction and move the elevators to bring the airplane back to said pre-determined altitude. When the plane is being flown and controlled by the liquid level switches at a constant altitude the liquid level switches 260 and 262 are maintained in parallel horizontal relation. These liquid level switches 260 and 262 are positioned in longitudinal relation with the fuselage of the airplane so that they will control the angle of climb or dive as indicated above.

Now, considering for example that photo-electric cell 434 is made inoperative then the current flow to motor 122 will be as follows: Electro-magnet 602 will be de-energized and armature 604 will break contact with point 606 so that current from negative feed wire 512 through wire 720, wire 728, wire 726, electro-magnet 554, wire 730, contact point 598, armature 596, wire 732, wire 724, wire 718 to the positive feed wire 510. The current from negative wire 512 passes to wire 720, wire 755, switch 518, wire 753, through switch 548, wire 751, wire 746, terminal 742 of field coil 123, through field coil to terminal 738, wire 740, to wire 776, switch 546, wire 774, through switch 516, wire 772, to wire 718 which connects with positive feed wire 510, thus causing the flow of current through the field coil 123 in the proper direction to cause the motor to maintain the airplane at the proper inclination. When the liquid level switches 260 and 262 are inclined in reverse direction from that shown in Fig. 20 and the plane is moving on a downward course then the opaque member 412 will be on the reverse side of the photo-electric cell assembly and will move to intercept light from bulb 432 to photo-electric cell 436. When this occurs the magnet 528 will be energized and electro-magnet 554 will be de-energized and the current will be caused to flow through the field current 123 in the reverse direction to maintain the proper angle of dive.

To prevent transverse tilting of the airplane in the straight-away level flying position liquid level switches 316, 318 and 320 are provided.

These switches are disposed transversely of the fuselage and are adapted to be tilted in either direction by hand wheel 352 to control the ailerons for turn or bank. These liquid level switches are shown in the horizontal position so that all switches controlled thereby are open. Therefore, so long as the transverse axis of the airplane remains in a horizontal position these switches remain inactive and the ailerons maintain their normal position for level flying; however should the airplane be tilted in either direction then the switches at the low side of the liquid level switches 316, 318 and 320 would be closed and the servo-motor 120 would be operated in the proper direction to move the ailerons, whereby the airplane would be returned to a transverse horizontal position. For example it will be considered that the airplane tilts transversely so that switches 855, 843 and 849 are closed then the current from the negative feed wire 512 will pass through wire 856, through switch 855, wire 858, through the standard delay switch 890, to the field coil 121 of motor 120, thence to wire 869, wire 842, through switch 843, wire 844, to the positive feed wire 510. When the liquid level switches are so tilted the current to the rotor of motor 120 passes from feed wire 510, wire 846, motor 120, wire 848, switch 849, wire 850, wire 856, to negative feed wire 512. This will cause the motor 120 to rotate and move the ailerons 38 and 40 in reverse directions to cause the plane to return to the transverse, level position. When the plane is tilted so that switches 867, 863 and 853 are closed then it is quite apparent that the motor 120 will be rotated in the reverse direction to straighten the airplane to the straight-away flying position.

When it is desired to bank the airplane for a turn, it will be noted that arm 372 will be moved out of engagement with resilient switch arm 374 thereby closing points 388 and 380 and also the points 382 and 390. At the same time switch points 392 and 378 will be open. Since it is essential to also control the rudder during the turning operation, it will be noted that the current to the electro-magnets 664 and 682 for the reversal of the direction of rotation of motor 124 is controlled through the liquid level switches 316 and 318 with the switches 316 and 318 in the tilted position as described above. From positive feed wire 510 the current passes through wire 844 to closed switch 843, to wire 842, to point 382, point 290, wire 840, wire 826, through magnet 682, to wire 824 which connects with negative feed wire 512. The flow of current to the motor 124 when electro-magnet 682 is energized, as shown, will be described when showing the circuit as controlled by the turn indicator. It will thus be apparent that the tilting of the liquid levels 316, 318, and 320 is adapted to control the operation of motors 120 and 124 in both directions to regulate the position of the ailerons and the rudder. So long as the operator leaves the switches 316, 318, and 320 in the tilted position relative to the transverse plane of the airplane, the airplane will fly in a circle at an angle depending upon the angle of inclination of said switches. While a specific mechanical means has been provided for the various control and adjustment devices it is very apparent that various changes might be made without departing from the spirit of the invention and it is therefore desired to be limited only by the scope of the claims.

The turn indicator shown in Figs. 12 and 13 and also diagrammatically in Fig. 20 is shown positioned in Fig. 20 with the light from bulb 620 shining through opening 624 to energize photo-electric cell 628 thus causing a current to be set up in line 818, magnetic coil 642, wire 818, to wire 818, thence from point 392 to point 378, arm 374, wire 812, to battery 834, wire 814, wire 820, to the cathode of photo-electric cell 628. This energizing of magnetic coil 642 closes the armature 644 so that the current from negative feed 512 passes through wire 824, wire 828, through electro-magnet 682, to wire 826, point 646, armature 644, wire 834, to wire 822, which connects with the positive feed wire 510. This energizes electro-magnet 682, to close switches 674, 676 and 678 and to open switches 670 and 672.

The current from the positive feed wire 510 passes through wire 822, wire 884, switch 652, wire 882, switch 674, wire 880, to one side of the field coil 125 of motor 124. The other side of said field coil 125 is connected by wire 892, through switch 676, wire 894, switch 654, wire 896, to wire 824 and negative feed wire 512, to wire 824 which connects with negative feed wire 512. The rotor current of motor 124 from positive feed wire 510 passes through wire 870 to one pole of the rotor. The other pole of said rotor connects with wire 872 through switch 678, wire 874, wire 876, to wire 824, which joins the negative feed wire 512. It is quite apparent that should member 610 be moved in the reverse direction that electro-magnets 668 would be energized and 682 would be de-energized, therefore reversing the direction of flow of current to the field coil 125 to reverse the motor 124 which would operate the rudder in the reverse direction to correct the direction of travel.

On straight-away flying the moveable turn-indicator member 610 normally covers openings 622 and 624; however should the plane vary from a straight course, one of the photo-electric cells would be energized to cause the operation of servo-motor 124 which in turn would operate the rudder to return the airplane to the proper course. It is apparent from the above description that this automatic pilot will maintain the airplane in straight-away level flying, that it can be set by the operator to climb or dive at a predetermined angle and to level off at a predetermined altitude. Furthermore, it may be set by the operator to produce the desired angle of turn and degree of bank of turn in either direction when flying at a given altitude or during the climb or dive.

Having thus described the invention, what is claimed as new and desired to be secured by Letters Patent is:

1. In an automatic pilot for airplanes as described, a pivotal stabilizing element, a slidably mounted gear box, a cable connecting said stabilizing element with said slidably mounted gear box, an electric motor adapted to be energized when the airplane varies from a predetermined stable position, a worm drive shaft driven by said motor, a worm gear mounted in said gear box to operatively engage said worm drive shaft, a clutch member carried by said gear box operable to lock said worm gear against rotation, a centrifugal governor carried by said gear box and driven by said electric motor adapted to operate said clutch member to lock said worm gear whereby the worm shaft will engage the locked worm gear and cause the gear box to move longitudinally of said worm shaft.

2. In an automatic pilot for airplanes, a pivotal stabilizing element, a slidably mounted gear box, a cable connecting said stabilizing element with said slidably mounted gear box, a reversible electric motor adapted to be energized when the airplane substantially varies from a predetermined stable position, a worm drive shaft driven by said motor, a worm gear normally mounted for rotation in said gear box to operatively engage said worm drive shaft, a clutch member carried by said gear box operable to lock said worm gear against rotation, a centrifugal governor carried by said gear box and driven by said electric motor adapted to operate said clutch member to lock said worm gear against rotation whereby the worm shaft will engage the locked worm gear and cause the gear box to move longitudinally of said worm shaft.

EARL HENRY FRANCIS.